R. L. HERBST.
PULLEY.
APPLICATION FILED OCT. 13, 1919.
1,348,415.
Patented Aug. 3, 1920.
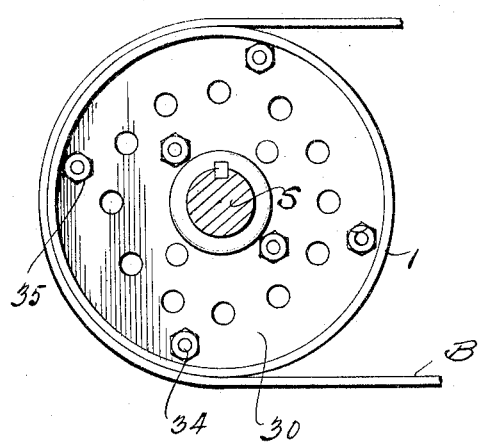
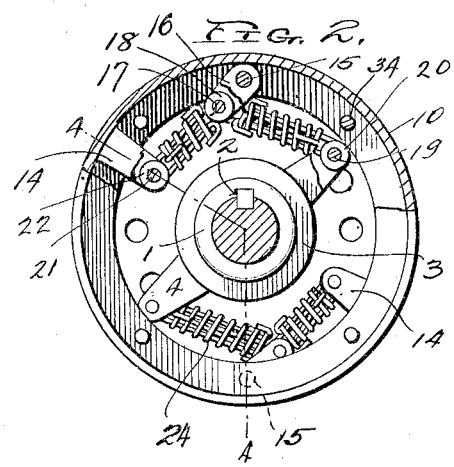
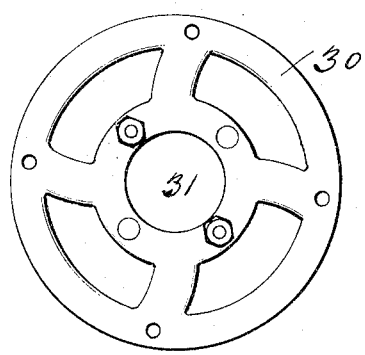
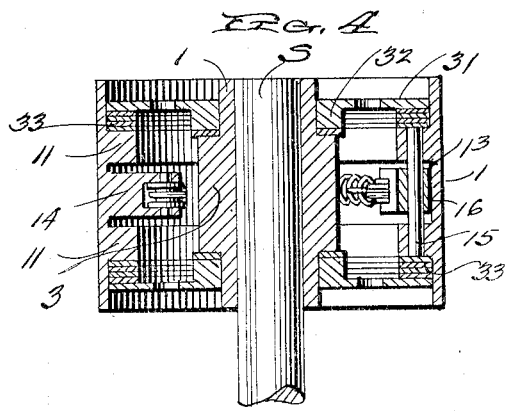
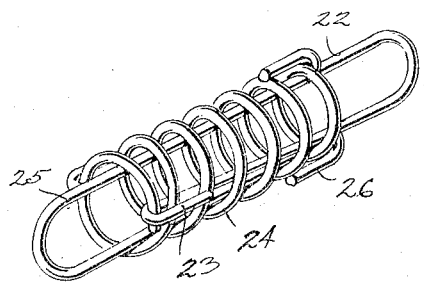
Inventor
Robert L. Herbst

UNITED STATES PATENT OFFICE.

ROBERT L. HERBST, OF HORTONVILLE, WISCONSIN.

PULLEY.

1,348,415.   Specification of Letters Patent.   Patented Aug. 3, 1920.

Application filed October 13, 1919. Serial No. 330,169.

*To all whom it may concern:*

Be it known that I, ROBERT L. HERBST, a citizen of the United States, residing at Hortonville, in the county of Outagamie, State of Wisconsin, have invented certain new and useful Improvements in Pulleys; and I do hereby declare the following to be a full, clear, and exact description of the invention, such as will enable others skilled in the art to which it appertains to make and use the same.

This invention relates to pulleys, and more especially to movable wheel mounts; and the object of the same is to produce a wheel or pulley whose rim is movable concentrically around its hub to a limited extent and connected therewith by springs in a novel manner.

It is well known to engineers that occasions arise where the power connected with the rim of a wheel as by belting or gearing is not constant and steady, and it becomes desirable to provide a little lost motion between the rim and the hub so that the former may travel ahead of the latter under impulses of power, leaving the hub and its shaft to catch up between power impulses. Also the reverse condition is occasionally found where the hub of the wheel or pulley is fast on the driven shaft, and when power is applied to the rim unsteadily such lost motion permits it to run ahead of the hub, leaving the latter and its shaft to catch up. In a word, the rim is mounted movably around its hub and is held yieldably in its proper position thereon.

The present invention covers a wheel or pulley of this type, and embodies novel details of construction and connection of parts with the object of keeping the springs out of contact with other elements which would wear them and of providing means for taking up as much as possible of the wear which inevitably occurs in such a structure. A simple and successful manner of carrying out the invention is set forth below and shown in the drawings wherein:

Figure 1 is an end view of a pulley of this kind, showing its perforated plate in place.

Fig. 2 is a similar view with the plate removed and one of the rings partly broken away.

Fig. 3 is an elevation of an end plate having spokes instead of perforations.

Fig. 4 is a section through the complete wheel on the line 4—4 of Fig. 2.

Fig. 5 is a detail of one of the springs.

The hub of this wheel is made up of a long sleeve 1 having a key-way 2 in its bore, an exterior collar 3 at the midlength of the sleeve, and diametrically opposite bifurcated lugs 4 radiating from the collar. Instead of the key-way, any suitable means might be provided for fastening the sleeve on the shaft which latter is indicated at S.

The other member of the wheel or pulley which is mounted concentrically around the hub comprises a rim 10 herein shown as flat on its outer face for a belt B although it might be otherwise shaped and in fact it could be toothed if desired, a pair of spaced rings 11 formed integrally within or otherwise rigidly secured to the rim and standing at some little distance in from its edges, and a pair of oppositely disposed bifurcated lugs 14 mounted in the channel 13 between said rings, their inner ends being spaced from each other a sufficient distance to permit the collar 3 to stand and move freely between them without coming in contact with them. Adjacent each lug a pin or screw 15 is passed through the rings and across the channel, and on this pin is pivotally mounted a U-shaped rocker 16, its arms connected by another pin 17 which may well be surrounded by a sleeve 18. Through the arms of each bifurcated lug 4 is passed a pin 19 surrounded by a sleeve 20, and through the arms of each lug 14 another pin 21 surrounded by a sleeve 22. A spring connects the pin 21 with the pin 17, and another spring connects the pins 17 and 19; this arrangement being duplicated at the opposite side of the collar, and thus the midlength of the two springs or the compound spring is held out from the collar by the rocker 16. As best seen in Fig. 5 each spring is preferably composed of a U-shaped bail 22 having the ends of its arms hooked as at 23, a helical spring 24 surrounding these arms and resting at one end in the hooks, and a second bail 25 reversely disposed and having hook ends 26 engaging the other extremity of the spring, the bends of the two bails being passed around the sleeves which in turn surround the pins that this spring element is to connect. Thus all parts of the element are held out of contact with all parts of the wheel, excepting where said bends pass around the sleeves.

For holding the rim concentrically around the hub, end plates 30 are provided, each having a body which may be perforated as seen in Fig. 1, or may have spokes or be otherwise of skeleton formation as seen in Fig. 3, and each having an ample central opening 31 of a size to freely surround one end of the sleeve 1, the plate being reinforced on its inner face by a shoulder 32 which surrounds the opening and is adapted to make close contact with one end of the collar 3 at the midlength of the hub. As the members of the pulley move relative to each other, the abutting faces of the shoulder and collar will wear in time, and therefore I interpose a number of thin washers 33 between each plate 30 and the ring 11 within the rim; and the plate is fastened to this ring by a number of through bolts 34. These bolts may have heads on one end and nuts 35 on the other, so that when the nut is removed the bolt can be entirely withdrawn; or if preferred, they may be stud bolts, each passing through one plate and screwed into one ring, and the removal of a set of these bolts will permit the removal of one plate while the other remains in place. One of the thin washers 33 can then be taken out and the parts restored, or these washers might be of such character that tightening up on the bolts would draw the plates inward a little and compress the washers to take up wear. These details are unimportant and can be left to the manufacturer. The spring connection leads from each lug 14 in the rim in one direction to the adjacent rocker 16 and thence on to one lug 4 on the hub, and as the opposite spring connection leads in the same direction around the wheel, the latter of course must be fastened on its shaft and connected to its power such as the belt with due regard to its direction of rotation.

Assuming that a shaft S carries such a pulley and power is communicated from an unsteady engine or motor through a belt B to the rim, it will be obvious that every impulse of power moves the rim a little forward of its own hub in the direction of rotation, the spring elements expanding to permit; and after the impulse the rotation of the driven shaft S and the hub causes the last-named member to catch up with the rim, so that in effect the impulses are neutralized and the result is the steady rotation of the driven shaft. Manifestly, therefore, the lugs 14 in the rim must be ahead of the lugs 4 on the hub if this be a driven pulley. If it be used as a driving pulley and the hub is mounted on the power shaft, the lugs 4 must be ahead of the lugs 14. In either case the rocker 16 is between the two lugs and serves to hold the midlength of the spring element outward well beyond the collar. I have shown one of the springs as considerably longer than the other. This detail may be employed if preferred, and in fact, one spring of each spring element may be made stouter than the other, when the weaker spring yields first and the stronger yields later if required.

What is claimed is:

1. A pulley comprising hub and rim members, means holding the rim concentrically and movably around the hub, lugs on each member projecting toward the other, springs connecting said lugs in pairs around the wheel, and means within the rim holding the midlength of each spring diverted away from the hub.

2. A pulley comprising hub and rim members, means holding the rim concentrically and movably around the hub, lugs on each member projecting toward the other, spring elements connecting said lugs in pairs and extending in corresponding directions around the wheel, and rockers within the rim, each holding the midlength of one spring element diverted away from the hub.

3. A pulley comprising hub and rim members, means holding the rim concentrically and movably around the hub, spring elements connecting said members at points around the wheel, rockers pivoted at their outer ends within the rim at points substantially opposite the midlength of said elements, and pivotal connections between the inner end of each rocker and one of said elements at a point to hold it out of contact with the hub.

4. A pulley comprising hub and rim members, means holding the rim concentrically and movably around the hub, lugs on each member projecting toward the other, spring elements connecting said lugs in pairs and extending in corresponding directions around the wheel, rockers pivoted at their outer ends within the rim at points substantially opposite the midlength of said elements, and pivotal connections between the inner end of each rocker and one of said elements at a point to hold it out of contact with the hub.

5. In a pulley of the type described, the combination with a hub element having a radial lug, a rim element having an internal lug, and end plates on the rim element having bearings for the ends of the other element; of a rocker pivoted at its outer end within the rim between said lugs, pins on the lugs and the rocker, and a spring element in two members one having its ends connected with the pin of one lug and that of the rocker and the other having its ends connected with the rocker-pin and that of the other lug.

6. In a pulley of the type described, the combination with a hub element having a radial bifurcated lug, a rim element having an internal bifurcated lug, and end plates on the rim element having bearings for the ends of the other element; of a rocker pivoted at its outer end within the rim between said lugs and bifurcated at its inner end, pins across the bifurcated ends of the lugs and the rocker, and a spring element in two members one having its ends connected with the pin of one lug and that of the rocker and the other having its ends connected with the rocker-pin and that of the other lug.

7. In a pulley of the type described, the combination with a hub element having a radial lug, a rim element having an internal lug, and axial pins on said lugs; of a rocker pivoted at its outer end within the rim near its lug and bifurcated at its inner end, a pin across the bifurcations of the rocker, sleeves on all pins, and a spring element in two members having bends in their ends, one bend of each member mounted on the sleeve of the rocker and the other bends of the members mounted on the sleeves of the respective lugs.

8. In a pulley of the type described, the combination with a hub element having a radial bifurcated lug, a rim element having an internal bifurcated lug, and end plates on the rim element having openings for the ends of the other element; of a rocker pivoted at its outer end within the rim near said lug and bifurcated at its inner end, pins across the bifurcations of the lugs and rocker, sleeves on said pins, and a spring element in two members having bends in their ends, one bend of each member mounted on the sleeve of the rocker and the other bends of the members mounted on the sleeves of the respective lugs.

In testimony whereof, I affix my signature in the presence of two witnesses.

ROBERT L. HERBST.

Witnesses:
  FRANK STEIDL,
  JOE JALIN.